E. E. GOLD.
GASKET FOR HOSE COUPLINGS.
APPLICATION FILED JULY 24, 1916.

1,251,767.

Patented Jan. 1, 1918.

WITNESSES:
René Bruine
L. J. Wallace

INVENTOR:
Edward E. Gold
By Attorneys,
Fraser, Tuck & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

GASKET FOR HOSE-COUPLINGS.

1,251,767.      Specification of Letters Patent.      Patented Jan. 1, 1918.

Application filed July 24, 1916. Serial No. 110,939.

*To all whom it may concern:*

Be it known that I, EDWARD E. GOLD, a citizen of the United States of America, residing in the borough of Manhattan, city, county, and State of New York, have invented certain new and useful Improvements in Gaskets for Hose-Couplings, of which the following is a specification.

My invention relates to gaskets for hose couplings and is particularly adapted for use in the mating ends of couplers for steam hose.

It is important that means should be provided for securely retaining gaskets in the mating ends of direct port hose couplers. It is likewise important that such retaining means should have elasticity so that they may be applied to a gasket and permit the gasket to be inserted by a train hand without especial appliances. It is likewise an advantage that such retaining means should be capable of removal from a worn gasket for the purpose of insertion in a new gasket. It is further desirable that such retaining means should be capable of coöperating with a shoulder with which the bores of couplers are usually provided for the purpose of holding the gasket in position.

My invention has for its object to produce a device which shall be capable of easy application to a gasket and which shall securely retain the gasket in place by engaging behind the shoulder in the bore of the coupler to which the gasket is applied. In carrying my invention into effect, I have provided a ring which is preferably a split spring ring and which is provided with means for holding the same in a gasket, for which purpose I have shown the ring as having projections adapted to enter recesses in the gasket. Means are provided for retaining the gasket in the coupler head comprising tongues projecting rearwardly from the ring and bent circumferentially, and which at their extremities are bent laterally outward, forming tongues which are adapted to engage behind a shoulder in the bore of the coupler.

Figure 1:
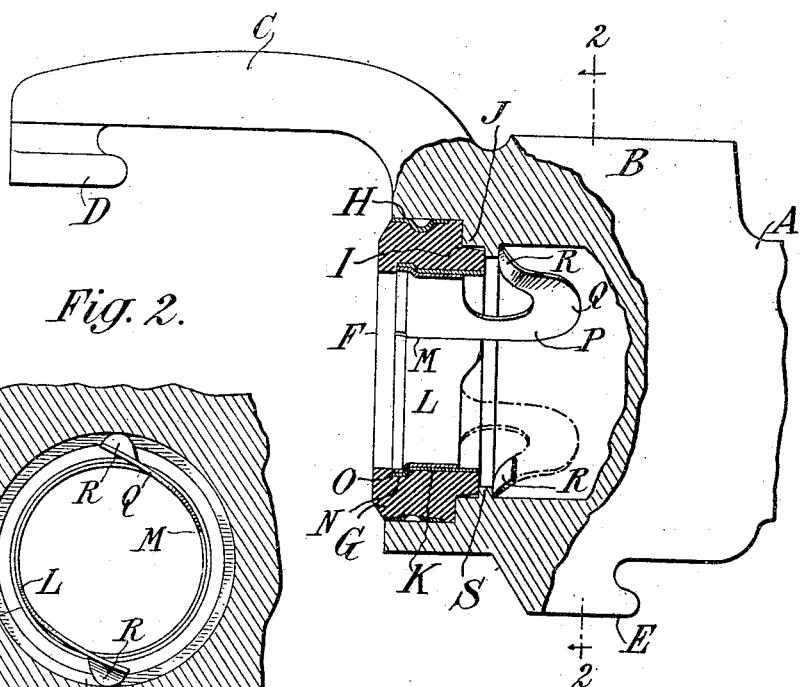
Figure 2:
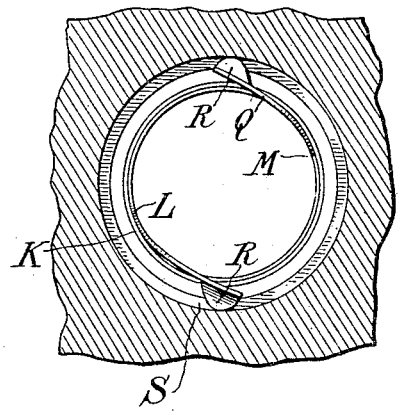
Figure 3:
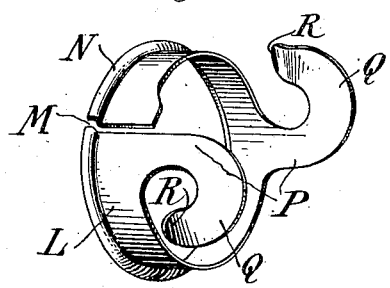

A desirable form in which my invention may be embodied is illustrated in the accompanying drawing wherein Figure 1 is a view partly in section of a coupler head, illustrating the means of retaining a gasket therein according to my invention;

Fig. 2 is a cross-section on the line 2—2 of Fig. 1 looking in the direction of the arrows, and Fig. 3 is a perspective view of the gasket retaining device separately.

My invention is adapted to a variety of uses. It is particularly designed, however, with reference to use in retaining a gasket in the meeting face of direct port couplers and accordingly I have illustrated by invention as applied to such coupling head.

In Fig. 1 I have illustrated a direct port coupler of the familiar Gold type, wherein the coupler head A is provided with a body B and with a projecting arm C; on the outer face of this is a cam D and on the body is a lug E. Mating couplers are similarly constructed and are locked by engaging the cam D behind the lug E on the body of the mating coupler and forcing the faces F together by a downward swinging movement. Each coupler head is usually provided with a gasket G formed of suitable material, such as vulca-beston, and which on its outer surface is usually provided with a ring or band H molded in the body of the gasket. The gasket is provided with a groove I which engages against a shoulder J in the bore of the coupler for the purpose of seating the gasket. The gasket illustrated is of the fixed non-oscillating type for which my invention is particularly adapted but to which I do not think that it is necessarily limited. On its inner face the gasket is usually provided with a band K which is molded in the body of the gasket.

My invention relates to the means for holding the gasket illustrated in a coupler head. In order to accomplish this, I provide a ring L which is preferably made of spring metal and split at M for the purpose of easy insertion in the bore of the gasket. Means are provided for retaining the ring in the gasket which may take the form of projections N engaging in recesses O in the inner face of the gasket body. As illustrated, such projections N are in the form of circumferential shoulders or beads on the ring which engage in annular grooves O in the gasket.

Projecting rearwardly from the ring L are tongues P, of which two are illustrated, although any suitable number may be employed. The said tongues are preferably spring tongues. At their rear portions these tongues are formed into return portions Q, by curving them in circumferential direction, and then forwardly, so that their extreme ends extend substantially toward the ring and are bent laterally outward at R forming projections which extend laterally outward of the ring and are adapted to engage behind a shoulder S in the bore of a coupler. The couplers are usually provided with such shoulders.

By means of the said spring projections R and of their engagement behind the shoulders S, the gasket G is securely maintained in position in the coupler head.

When it is desired to withdraw the gasket for the purpose of inserting a new one, this may be easily accomplished by inserting a nail or screw-driver, or any similar small device, behind one of the spring tongues and pressing the outer end thereof out of locking position. The gasket may then easily be withdrawn from the coupler head.

I have illustrated in the accompanying drawings and have described the most desirable form of my invention now known to me, but the same is not limited thereto, as modifications may be made therein within the limits of the appended claims.

What I claim is:—

1. A device for retaining a gasket in a hose coupler, comprising a ring having means for retaining it in a gasket and tongues projecting rearwardly from said ring, said tongues having their inner portions turned circumferentially and their end portions bent outward and adapted to engage behind a shoulder in the bore of a coupler to hold the gasket in place.

2. A device for retaining a gasket in a hose coupler, comprising a spring ring having means for retaining it in a gasket and spring tongues projecting rearwardly from said ring, said tongues having their inner portions curved circumferentially and forwardly, and their ends bent outwardly and adapted to engage behind a shoulder in the bore of a coupler to hold the gasket in place.

In witness whereof, I have hereunto signed my name.

EDWARD E. GOLD.

Witness:
H. C. POILLON.

Copies of this patent may be obtained for five cents each, by addressing the "Commissioner of Patents, Washington, D. C."